July 7, 1964   H. DERSCHMIDT ETAL   3,139,937
ROTARY WING AIRCRAFT
Filed July 21, 1961   7 Sheets-Sheet 1

Inventors
HANS DERSCHMIDT
GERHARD ECK
BY M. Glew and Toren
ATTORNEYS

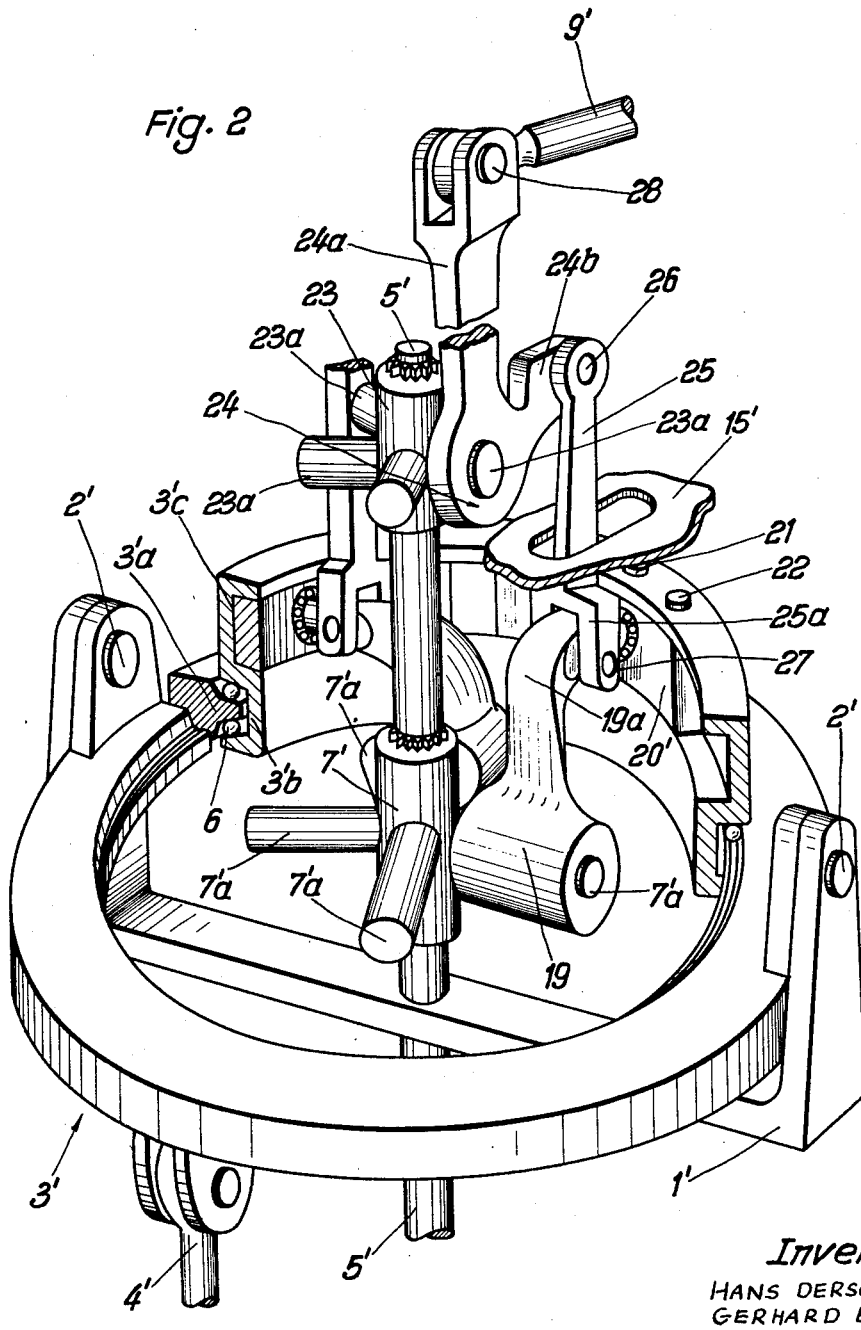

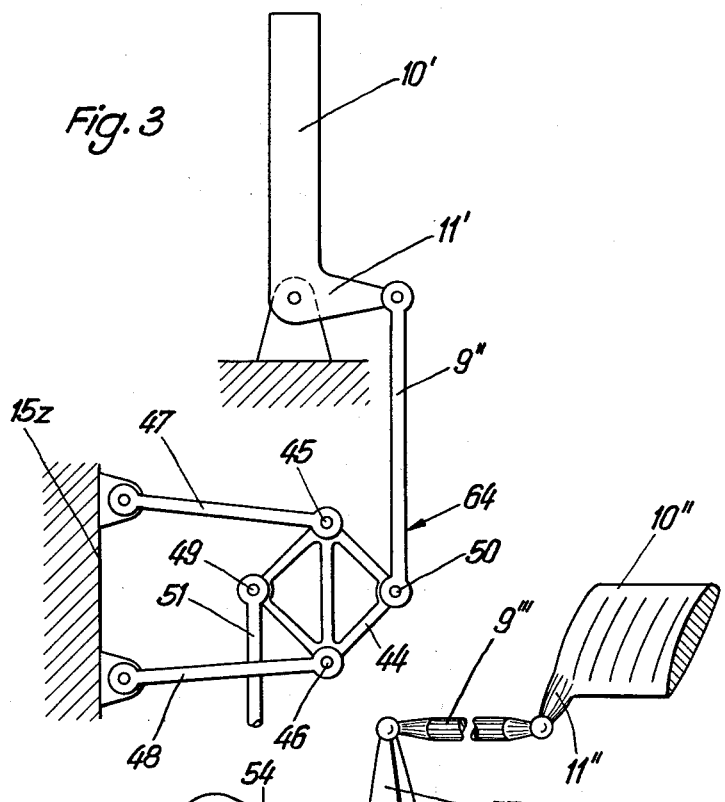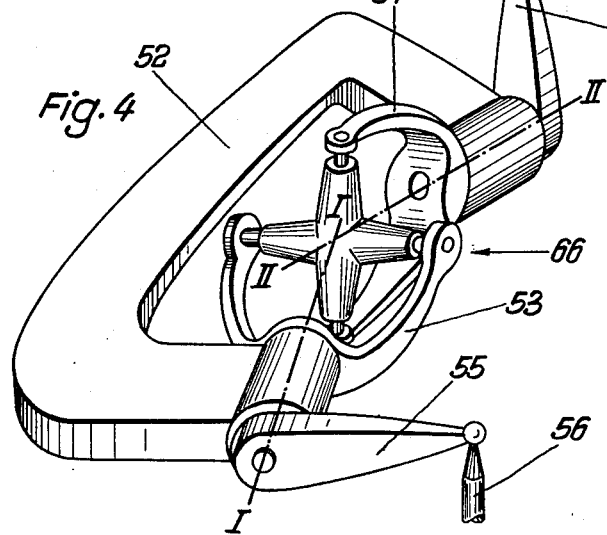

July 7, 1964

H. DERSCHMIDT ETAL 3,139,937

ROTARY WING AIRCRAFT

Filed July 21, 1961

Inventors:
HANS DERSCHMIDT
GERHARD ECK
BY McGlew and Toren
ATTORNEYS

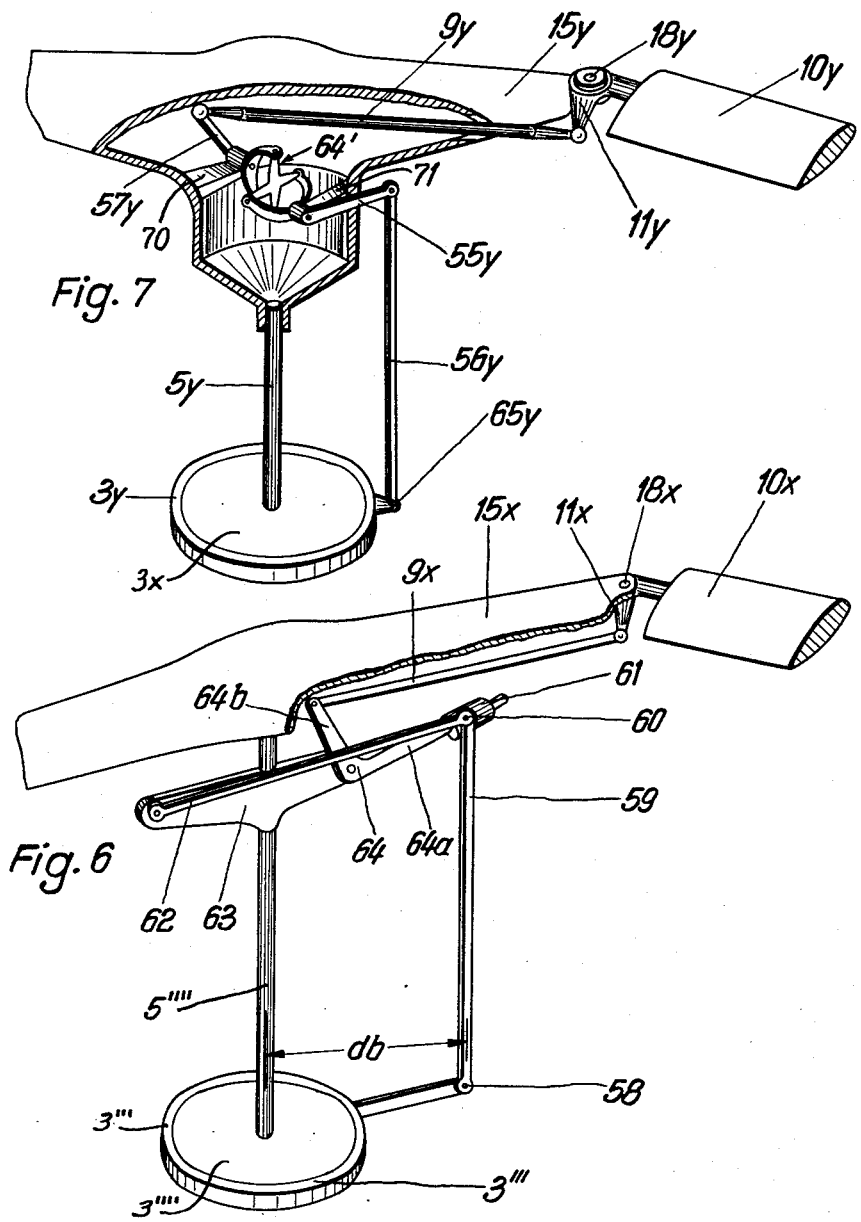

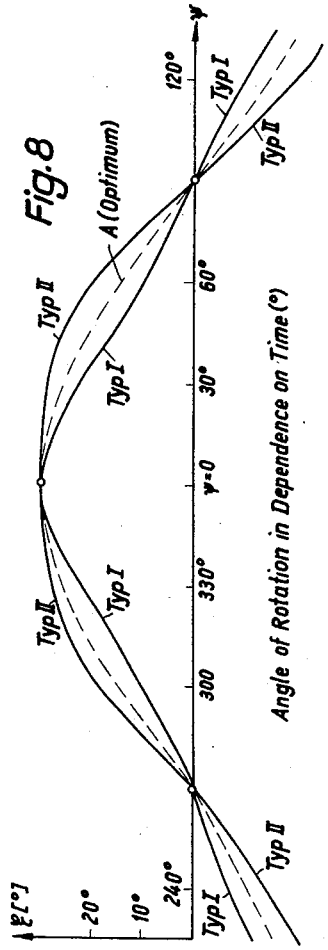
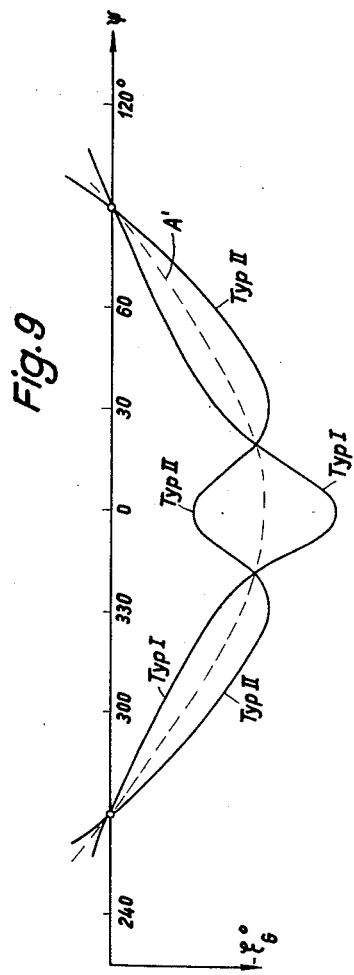

United States Patent Office 3,139,937
Patented July 7, 1964

3,139,937
ROTARY WING AIRCRAFT
Hans Derschmidt and Gerhard Eck, both of Munich, Germany, assignors to Bölkow-Entwicklungen Kommanditgesellschaft, Ottobrunn, near Munich, Germany
Filed July 21, 1961, Ser. No. 125,784
Claims priority, application Germany July 21, 1960
8 Claims. (Cl. 170—160.25)

This invention relates in general to rotary wing aircraft or helicopters and in particular to a new and useful transmission for effecting the controlled rotation of the helicopter blades.

In order to enhance the rotational characteristics of helicopter blades, attempts have been made to provide transmissions which produce periodic varying speeds for the blades at various locations of their arc of rotation. For example, a reduced speed is imparted to the blades as they are moved into arcuate positions at the forward portion of the aircraft and an increased rotary speed is imparted to the blades as they are moved through the trailing arc of rotation. Devices of this nature have a serious disadvantage in that the active radius of the crank arm carrying the rotor blade, as measured by the perpendicular length from the connecting rod articulated by the rotor shaft, is shortened with increasing advancing angles and increased acceleration takes place which causes a great deviation of the acceleration course of the blades from a desired rotary characteristic, such as would occur from a freely moving centrifugal pendulum, for example.

In accordance with the present invention, the helicopter blades are mounted in association with a transmission which includes means for advancing the blades angularly as they rotate through their forward portion of movement and for moving the blades backwardly angularly as they are moved through the trailing portion of arcuate movement. The means provided insures that the blade movements conform to a theoretical desirable freely swinging centrifugal pendulum movement. The transmission mechanism also insures that the forces which are necessary for effecting such blade movement are as small as possible.

A rotary wing aircraft constructed in accordance with the invention is an improvement over known rotary wing constructions, particularly in the fact that the mass or inertia forces which are generated due to the differences of the angle accelerations of the free advancing or retarding movement of the blades and that caused by the operating parts of the transmission means are reduced at large advancing or retarding angles to an insignificant value so that the transmission means for producing such movement is stressed to only a small extent and thus its life is significantly increased.

Accordingly, it is an object of this invention to provide an improved helicopter rotor construction.

A further object of the invention is to provide a transmission mechanism for rotating the blades of a helicopter.

A further object of the invention is to provide a helicopter transmission mechanism including means for advancing and retarding the speed of rotative movement of the blades in a precise controlled manner.

A further object of the invention is to provide a helicopter transmission including a rotatable shaft having arms of a number corresponding to the number of helicopter blades and pivotal levers connected to the arms and to the blades and including means to pivot the levers to advance or retard the blades during their rotative movement for speeding up and slowing down of the blades at predetermined locations of their arcuate travels.

A further object of the invention is to provide a transmission device for a helicopter insuring that the rotative movement thereof conforms to a freely swinging pendulum.

A further object of the invention is to provide a helicopter transmission which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 2 is a view similar to FIG. 1 of another embodiment of the invention;

FIG. 3 is a schematic representation of another embodiment of the invention;

FIG. 4 is a fragmentary perspective of still another embodiment of the invention;

FIG. 6 is a fragmentary perspective view of still another embodiment of the invention;

FIG. 7 is a fragmentary perspective view of still another embodiment of the invention;

FIG. 8 is a graph indicating the displacement time characteristics of the extreme types of transmission mechanisms in respect to that of the present invention; and FIG. 9 is a graph similar to FIG. 8 indicating acceleration time representations.

Figure 1:
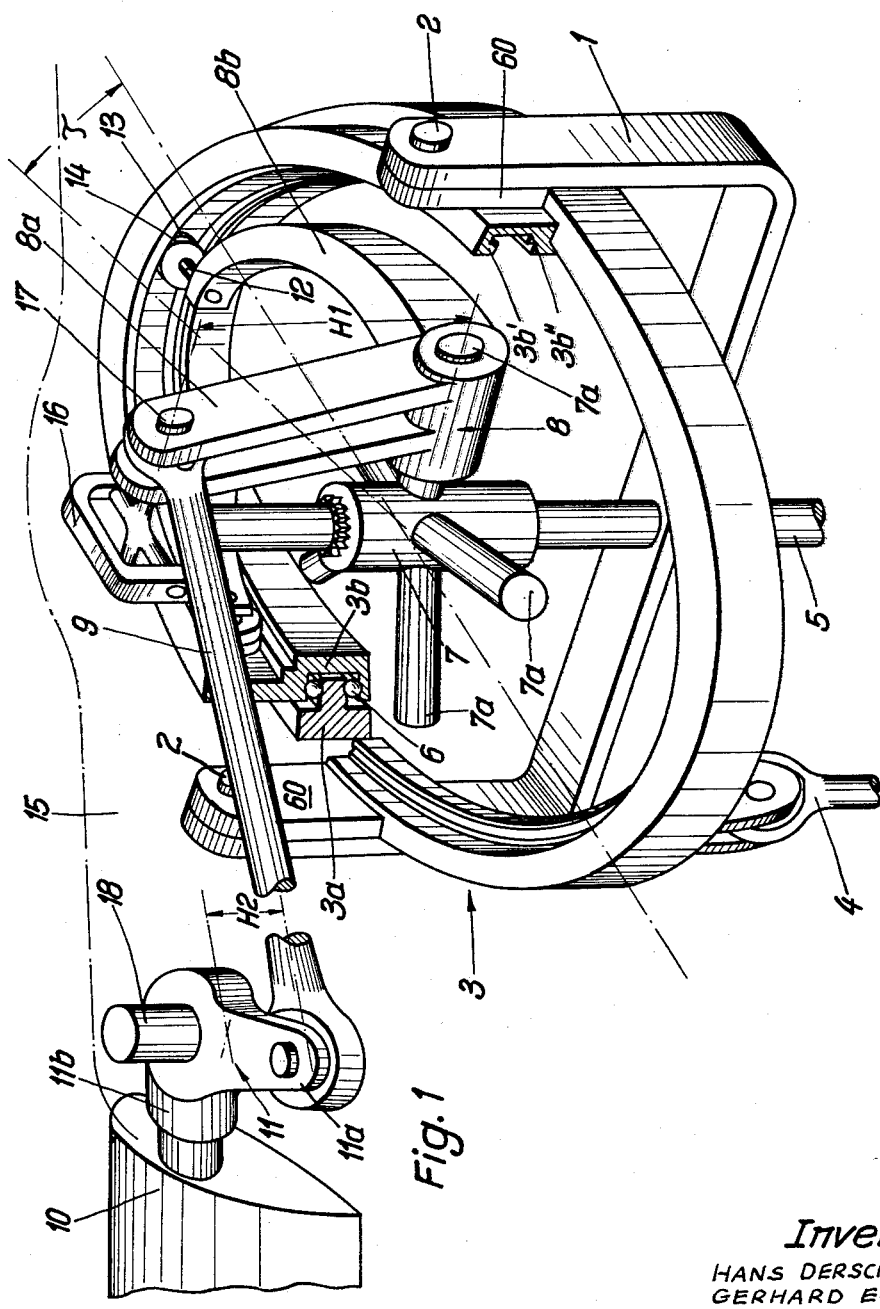
FIG. 1 is a fragmentary perspective view of a helicopter blade rotary transmission means constructed in accordance with the invention.

Referring to the drawings in particular, the invention embodied therein, as indicated in FIG. 1, includes a U-shaped stationary frame which is mounted to extend transverse to the longitudinal axis of an aircraft, such as a helicopter. An annular swash plate or supporting race generally designated 3 is suspended between the upstanding arms of the stationary frame 1 on side arms 60, 60 from bolts 2. The swash plates 3 may be pivoted in a known manner by manipulating a control rod 4 which normally extends into the pilot's cabin (not shown) for manipulation by the pilot. Tilting of the swash plate will change the amplitude of the advancing and retarding movements of the helicopter blades as they are rotated in a manner to be described more fully hereinafter.

In accordance with the invention, the swash plate 3 includes two concentrically arranged parts 3a and 3b, part 3a forming a pivotal support for the rotatable part 3b, which is guided over a ledge portion of the part 3a on rollers 6.

The aircraft includes a main rotor shaft 5 which is fitted adjacent its upper end with a socket or sleeve member 7 having a plurality of angularly spaced pin members or bolts 7a which extend perpendicular to the axis of the rotor shaft. The number of pins 7a corresponds to the number of rotor blades 10 to be employed in the aircraft. On each pin 7a there is pivotally mounted a crank arm member generally designated 8 which includes a curved arm 8b which terminates in rollers 13 and 14 which lie on trackways defined in the portion 3b, the rollers 13 bearing against an upper regular or straight guide surface 3b' and the roller 14 bearing against the lower regular or straight surface guide surface 3b''.

It should be appreciated that each of the pins 7a is provided with a crank arm 8 and associated mechanism, but these portions have not been indicated in the drawings for clarity of illustration purposes.

The crank arm 8 also includes a two-armed lever 8a which is connected to a connecting rod 9 by means of a bolt 17 which extends through the arms and an eyelet at the end of the rod 9. The connecting rod 9 is pivotally connected to one arm 11a of a crank arm 11 which is pivotable about an upstanding crank pin 18 which is mounted in a central rotatable portion or head indicated only in dotted lines at 15. The crank arm 11 includes another arm 11b which is rigidly connected to the wing 10 to support it within an enclosing portion of the central wing element or head 15. For this purpose the head 15 is provided with an opening large enough to permit shifting of the wing within the head opening by rotation of the crank arm 11 about its pivot 18. The rotor head 15, which is indicated in dot and dash lines, is articulated by means of a universal or cardan joint 16 which is arranged at the upper end of the rotor shaft 5 in line with the bolt 17 which connects the connecting rod 9 with the lever arm 8a.

In accordance with the invention, one of the arms 8b is provided with means such as rollers 13 and 14 or a duct connection at the end thereof which either form-fittingly or rigidly engages the rotatable part 3b of the swash plate 3 in order to cause rotation of the part 3b with the crank shaft 5. Thus, when the pilot manipulates the control rod 4 to tilt the swash plate 3, the outer end of the arm 8b is moved upwardly and downwardly as the rotor shaft 5 is rotated. This rocking of the crank arm member 8 causes rocking of the crank 11 about the axis 18 and swinging of the wing 10 about this axis. The arrangement is such that the blades 10 are advanced in the direction of rotation when they are rotated through the half segment of their rotation in the forward portion of the aircraft and they are retracted when they are rotated through the half section of rotation at the trailing portion of the aircraft.

It should be appreciated that although the rollers 13 and 14 provide a preferred arrangement, these may be eliminated and the arm connected directly to the part 3b which rotates around the stationary part 3a. Although it is not shown in FIG. 1, at least one of the arms 8b must be connected to the rotatable part 3b in order to cause it to move around upon rotation of the shaft 5. Another manner of accomplishing the same result is to eliminate the rotatable ring 3b and permit the rollers 13 and 14 to ride on the stationary swash plate 3a. This latter arrangement, however, has the disadvantage that with relatively high speed of the rotor and a constant load on the levers due to the air forces which are present on the rotor blades, the roller bearing and the swash plate running surface would be subjected to great wear. In addition, the preferred arrangement which has been illustrated has the advantage that it prevents lifting of the rollers or levers from the running surface during the operation.

When the swash plate 3 is not inclined, the rollers 13 and 14 which are mounted on the pin 12 concentrically relative to each other, move with their lever arms 8b with constant rotational speed synchronous with the rotation of the rotor shaft 5. However, if one views the individual lever arms from the projection in the direction of the rotor axis when the swash plate is inclined, then the individual levers describe on the swash plate relative movements in respect to each other. This is due the the speed variations which occur twice per revolution caused by the elliptical path.

When the rollers have reached the highest and lowest point, respectively, on the swash plate, their velocity relative to the inclined plate is smaller. When they have reached their medium height on the inclined swash plate, for example, at positions in alignment on each side of the axis of the bolt 2, then they reach a higher velocity relative to the lower (or raised) swash plate 3. These differences during the movement through the swash plate, are utilized in such a manner that upon reaching the center position of the blade, without a tilting deflection, the radial push movement of the connecting rod is increased relative to the sine-like course.

In accordance with the invention, by having a transmission ratio of the lever arm 8a defined as a proportion of the measured distance between the center pivots 7a and 17 (indicated in the drawings as H1), in respect to the distance between the center of the pivot of the connection of the connecting rod 9 to the crank arm 11 from the axis of the shaft 18 (designated H2), equal to 0.65 (H1 to H2=0.65), it occurs that the shortening of the active length of the lever 11 due to the varying take off velocities of the rollers 13 and 14 on the swash plate is compensated for in such a manner that a harmonic advancing or retarding movement is forced upon the rotor blades.

FIG. 2 indicates another embodiment in which similar parts are similarly designated but with a prime indication. In this embodiment the parts operate as described previously and the connecting rod 9' is also connected to a crank arm 11' similar to the crank arm 11 for the transmission of motion to the blades of the helicopter. In this embodiment, however, one-arm levels 19 are rotatably mounted on the pins 7'a and at the ends of these arms there are provided gliding stones 20a which are guided in annular groove 3'c which is formed in the rotatable part 3'b. In the same manner as in the embodiment of FIG. 1, one of the levers 19 which is illustrated connected with the rotative part 3'b of the swash plate and it is oscillated backwardly and forwardly upon rotation of the shaft 5'. The gliding stone 20' which is illustrated is connected to the movable portion 3'b by means of bolts 21 and 22 and it causes the rotation of the portion 3'b relatively to the portion 3'a.

It should be appreciated that only a single stone 20' is secured in position in respect to the part 3'c by a bolt 22. The remaining stones 20' are free to glide on the member 3'c.

In the embodiment of FIG. 2, at the upper end of the shaft 5' there is fitted another sleeve 23 which includes a plurality of pins 23a of the same member as the pins 7a. Each pin carries a crank arm generally designated 24 which includes an arm 24b which is pivotally connected at its outer end to a push rod 25 by means of a pivot pin 26. The opposite arm 24a is connected by means of a pin 28 to the connecting rod 9' which functions in the manner of the other embodiment. The lever arm 19a is constructed so that it is horizontal when it is in the center position of swash plate 3', i.e., the position of the plate 3' where there is no inclination. The push rod 25 includes bifurcated portions 25a at its lower end which are connected to the arm 19a by means of a pin 27. The rotor head 15' includes an opening to accommodate push rod 25. Upon angular movement of the rotor head relative to the rotor shaft 5 the titlting movement of the blades is only slightly influenced because the height of the connecting rod 9' above the universal joint center point is only slight.

The operation of the embodiment of FIG. 2 is as follows: Upon rotation of the rotor shaft 5' the arms 19a, which are moved by the inclined swash plate, are forced during one rotation to move up and down, respectively. In doing so, this movement is transmitted via the push rod 25 to the rotor blade (in a manner which is not shown in detail, but which is known in the prior art). The lever 24 simultaneously transmits the movement of the push rod 25 to effect a radial movement of the connecting rod 9'.

In FIGS. 3 and 4 there are indicated transmission elements which may cooperate with different driving arrangements for the purpose of obtaining the tilting movement of rotor blades. Such driving arrangements may, for example, comprise a swash plate for obtaining the tilting movement of the rotor blades, an eccentric or a spider, all of which produce approximately a sine-shaped translation movement at the transmission inlet side. The sine-shaped translation movement, produced or caused by the driving arrangement, is converted by an amplification or reduction of the various transmission elements in such a manner that the sine-shaped translatory movement at the transmission intake side is converted at the takeoff or exit side of the transmission into a sine wave movement. In accordance with the invention, this movement is transmitted to the rotor blades as a sine-shaped angular movement and the movement of the blades about their axes of rotation is increased, while the movement at the end position is decreased. The shortening of the active length of the lever arm which is arranged perpendicular to the rotor blade is compensated for by the controlled movement of the previously mentioned transmission elements.

FIG. 3 shows a schematic representation of a device for correcting the blade movement and includes a "corrected steering or guiding device" generally designated 64. It includes a rigid link or lever parallelogram 44. At opposite points 45 and 46 the link 44 is engaged by pivotal link members 47 and 48 which are pivotally mounted on the rotor head 15. At opposing points 49 and 50 of the parallelogram a push rod 51 and the connecting rod 9″ are pivotally connected. The push rod 51 may advantageously be connected to a swash plate similar to the push rod 25 of FIG. 2, for example.

At 50 the motion imparted by the movement of the push rod 51 is transmitted to the connecting rod 9″ and the crank arm 11′ to the blades 10′.

If, at the location of the inlet or crank 11′, a sine-shaped translatory movement is fed into the "corrected steering arrangement" 64 by means of the push rod 51, then upon smaller deviations the lever parallelogram 44 will, in addition to the translatory movement, perform a rotary movement about a momentary center. This rotary movement enlarges at the connecting point 50 of the connecting rod 9″ the movement of the connecting point 49 of the push rod 51 in the vicinity of the dead center of the sine-shaped movement. That is, when the connecting point 49 has larger deviations than at radial directions, then the rotation of the lever parallelogram 44 will be in the reverse so that the radial movement of the connecting point 50 will be smaller than the movement of the connecting point 49. In this manner, and in accordance with the invention, acceleration in the dead centers of the rotor blades 10 is compensated and substantially harmonic rotary advancing and retarding movement is accomplished, which approximates the movement of the freely swinging rotor blades to a centrifugal pendulum.

Figure 3A:
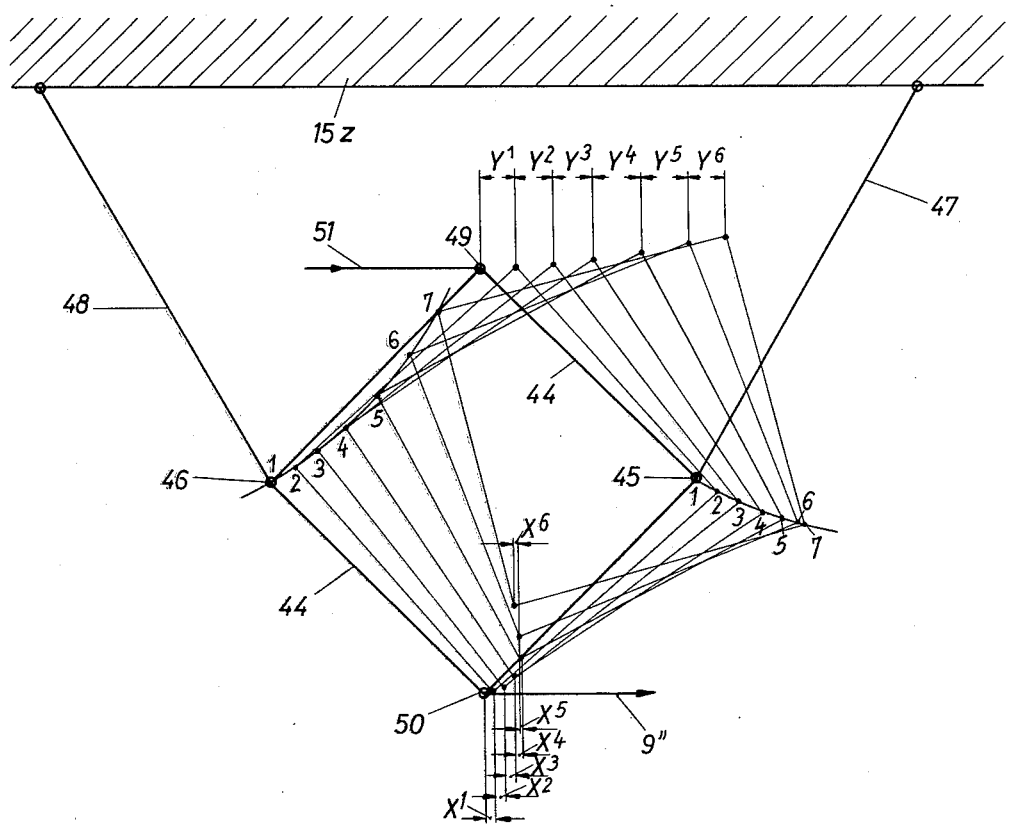
FIG. 3a is a schematic indication of a portion of the mechanism indicated in FIG. 3 showing the relative movements of the various parts.

In FIG. 3a the individual parts of the device are represented schematically for reasons of simplicity. If, at the input (not crank 11′) of the steering device, a sine-like translation movement is inserted by means of a normal swash plate (not shown) via the control rod 51, then the parallelogram 44, due to the articulation of the levers 47 and 48 at the points 45 and 46 performs, in addition to a translation movement in the direction of the arrow of the rod 51, an additional rotary movement about a momentary center. Both movements together and the lever length conditions which take place cause the movement of the point 50 of the rod 9″ to be progressively decreased in relation to the movement of the point 49.

FIG. 3a shows the parallelogram 44 in seven different positions wherein the individual corner points which are obtained are progressively numbered from 1 to 7. The points 1 correspond to the position of the parallelogram in the dead center or 0 position of the swash plate (see point 7). If there is a push movement of the rod 51 in the arrow direction, the corner points of the parallelogram migrate to the points 2–7 to a shorter or longer extent, dependent on the magnitude of the tilting angle of the blades. If one views the paths which have been traversed by the points 49 and 50, it will be ascertained that the paths $y$ of the points 49 increase to the same extent as the paths $x$ of the point 50. However, the paths $y$ are much larger than the paths $x$. Up to the dead center point of the sine curve-like movement, which point is situated about at the point 5, that is, if there is a larger deflection of the point 49 in the push direction, the paths $x$ and $y$ increase progressively, while upon further movement of the rod 51 from this point on the paths are progressively decreased. That is, in an extreme instance which could correspond to the points 6 and 7, the decrease is such that the point 50 will move backwardly. Due to this course of the points 49 and 50, the large accelerations in the dead point of the rotor blades are compensated and a tilting movement is obtained which is substantially harmonical with the movement of a freely swinging centrifugal pendulum. These paths of the point 50, which, relative to the point 49, are smaller, can be compensated by corresponding lengths of the lever arms 11′ at the rotor blade while maintaining the harmonic movement and acceleration course.

The transmission element shown in FIG. 4 serves the same purpose as the correcting steering arrangement 64 of FIG. 3. It includes a knuckle or gimbal joint generally designated 66 with oblique axes I—I and II—II which form an obtuse angle with each other. The rotational axes I—I and II—II pertaining to the knuckle joint are mounted in a common frame 52. The stirrup 53 of the joint lies in a center position in the plane which is formed by the joint axes of the knuckle joint while the stirrup 54 is arranged perpendicularly to this plane. At the two ends of the knuckle joint axes, which are situated outside the frame 52, one arm levers 55 and 57 are secured, of which lever 55 is connected at one end with one end of a push rod 56. The push rod 56 cooperates with a transmission element (not shown), for example, a swash plate or an eccentric for obtaining tilting movement of the rotor blades. The connecting rod 9‴ moved by the lever 57, and the other end of the connecting rod 9‴ is connected to the crank 11″ of the rotary wing or blades 10″.

When the arrangement illustrated in FIG. 4 is subjected, by means of the push rod 56, to a sine-shaped translatory movement, then, due to the characteristics of the universal joint, a changed translatory movement is taken off at the connection of the connecting rod 9‴ with the lever 57. This movement, upon larger deflection in the vicinity of the dead center position, decreases the acceleration and thus renders possible a sine-shaped movement of the rotor blades.

The transmission of movement in cardan joints is not uniform if the two shaft axes extend at an angle to each other. If the two shafts I—I and II—II, according to FIG. 4, are relatively off-set to each other about a bending angle $\alpha$ which generally is larger than 10°, and if the driving shaft I—I turns with a constant angular velocity of $\omega_1$, then the drive shaft II—II will, during each revolution, have twice the delay $\omega_2 \min = \omega_2 \cos \alpha$ and an acceleration of $$\omega_2 \max = \frac{\omega_1}{\cos \alpha}$$

In the present application we are not concerned with a cardan joint with rotating shafts, however, if there is a deflection of the lever 55 upwardly or downwardly, there occurs in each instance a delay of the shaft II—II which causes the desired movement and acceleration cause of the rotor blade.

Figure 5:
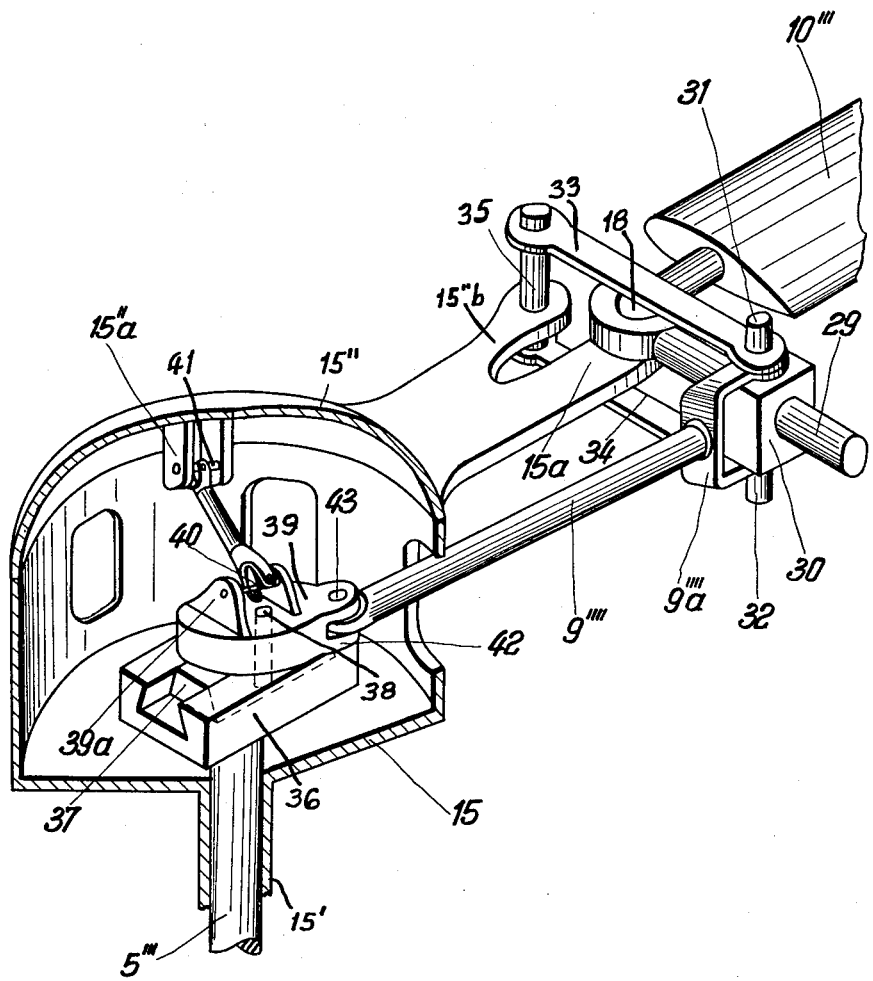
FIG. 5 is a fragmentary perspective view of still another embodiment of the invention.

In FIG. 5, a rotor head 15″ is forked-shaped and has an arm 15″a on which is mounted a swivel joint bolt 41. Perpendicular to a rotor blade 10‴, there is provided a lever arm 29 which is rigidly connected with swivel joints. At the lever arm 29 there is mounted a gliding stone 30 which is displaceable in a longitudinal direction. At the upper and lower sides of the gliding stone 30 there are provided pins 31 and 32 which are engaged by a bifurcated end 9⁗a of connecting rod 9''''. In addition, links 33 and 34 are connected to the pins 31 and 32 at one end and on the opposite end are connected to a bolt 35 which is mounted on the lever 15''b of the rotor head 15''. The bolt 35 is arranged adjacent the leading edge of the rotor 10'''. It is also located at the same radial distance as the swivel joint from the rotor shaft 5'''.

FIG. 5 also shows that the driving arrangement for obtaining the movement of the blade 10''' includes an eccentric drive. For this purpose a slideway 36 is secured to the upper end of a stationary spindle 5''' and carries a sliding block 37 which is displaceable in a known manner upon rotation of the rotor head to articulate the connecting rod 9'''' due to the eccentric position of the pin 38 relative to shaft 5'''. A pin 38 is arranged in the slide 37 parallel to the spindle 5 and extends upwardly therefrom to rotatably receive a disc-shaped part 39. The part 39 is connected via knuckle joints 40 and 41, the knuckle joints 40 being connected by means of the bearing bracket 39a to the part 39. The other end is connected to the rotor head via bearing bracket 15''a. Thus, the part 39 is forced to take part in the rotation of the rotor head. At the outer circumference of the disc 39, depending on the number of rotor blades provided, there are arranged a corresponding number of bearing eyes 42 which pivotally connect to the connecting rod 9''''.

The embodiment of FIG. 5 operates as follows: When the rotor head 15'' is rotated by the drive of the aircraft (not shown) and an eccentric position of the pin 38 is reached in the guide portion 36, then the connecting rod 9 is imparted with a sine-shaped radially extending translation movement in a known manner. The rotor head 15'' includes a tubular portion which rotates around spindle 5''' which is connected to a driving power source. In the vicinity of the center position of the rotor blade, that is, at a zero tilting or advancing angle, the active length of the lever arm 29 is only slightly changed in respect to the distances of pins 18 and 31 when a push movement is imparted to it via the connecting rod 9''''. Due to the provision of the links 33 and 34 which connect the stone with the pin 35, the active length of the arms 29 is almost constant. This is obtained with tilting angles of equal magnitude due to the large distance which the pin 35 has relative to the pin 18 from the stone pin 31 and from the flatly extending circular arc resulting therefrom which the pin 31 describes upon tilting. However, when larger tilting angles are present, the active length of the arm 29 is enlarged whereby the gliding stone 30 is displaced on its lever arm 29 relative to the pivot of the bolt 35 at the rotor head arm 15''b. This enlargement of the active lever arm 29 causes the desired correction of the blade movement and prevents, due to the sine-like course, excessive acceleration in the dead center position.

In FIG. 6 another embodiment is indicated of a "corrected steering device" for correcting blade movement. In this embodiment a swash plate ring 3''' is employed which rotates around a stationary plate 3'''' carried on spindle 5''''. Pivot points 58 of the takeoff lever 59 are disposed at a relatively large distance from the rotor axis of the shaft 5''''. This distance has been designated by the reference db. Due to the relatively large distance of the individual takeoffs from the rotor shaft 5'''', the advantages obtained at the swash plate 3''' need only be tilted in a very small amount in order to perform a larger translation movement on the push rod 59 which is disposed substantially parallel to the rotor shaft 5''''.

The other end of the push rod 59 is pivotally connected by a pin 60 on a displacement sleeve member 61. One end of a link 62 is also connected to the pin 60 and the other end of the link is pivotally connected with a cross member or transverse bar which is rigidly connected with the rotor shaft 5''''. The displacement sleeve 61 glides on one arm 64a of a crank arm member generally designated 64 which is pivotal on the cross member 63. Connecting rod 9x is articulated at the arm 64b, which arm in the center position extends parallel to the rotor axis. The other end of the connecting rod 9x is connected with the lever arm 11x for pivoting the rotor blades 10x around the pivot 18x. The tilting axis 18x is located at the end of the rotor head 15x.

In the embodiment shown in FIG. 6 the rotor 15y is rotated by means (not shown) to cause rotation of the swash plate ring 3''' and cause the push rod 59 to be moved parallel to the rotor shaft upwardly and downwardly during rotation (the swash plate is only indicated schematically). The push rod 59 moves the sleeve 61, which is movably mounted on the lever arm 64a. Upon smaller angles of inclination of the lever arm 64a, that is, in the vicinity of the horizontal center position, the active length of the lever arm 64 is only slightly changed. Upon larger deflections in the vicinity of the dead center point, that is, upon larger tilting angles, the displacement sleeve 61, due to the connection with the link 62, is pushed along the lever arm 64 further outwardly whereby the active length of the lever arm is increased in respect to the distances between 18x and the end of the crank 11x. Thus, the movement of the angular arm 64 is decreased and the excessive tilting acceleration of the rotor blades, due to a decrease of the active length of the arm 11x, is compensated for.

In FIG. 7 there is indicated another embodiment of the invention wherein the drive arrangement for obtaining a tilting movement of the rotor blade 10y includes a stationary swash plate 3x which is affixed to the shaft 5y and a rotatable ring 3y similar to that indicated in FIG. 1. The FIG. 7 embodiment includes a "corrected steering arrangement" or knuckle joint 64', such as indicated in FIG. 4. Lever 65y is guided by swash plate 3y (of which only one lever has been shown in the figure as in the other embodiment). Push rod 56y is articulated to the lever 55y which actuates the obliquely positioned knuckle joint 64'. Biasing blocks carried by a rotor head 15y provide rotatable support for levers 55y and 57y and they locate axes I—I and II—II as in the other embodiments. Lever 57y, which is arranged at the outer end of the II—II axis has a parallel position when in its center position predominantely toward the rotor shaft 5y. The free end of the lever 57y is pivotally connected to the connecting rod 9y which in turn actuates the crank arm 11y pivotally mounted at 18 on the rotor head 15y. The rotor blade 10y is rotated about the pivot 18y as in the other embodiments.

When the rotor head 15y with its rotor shaft 5y is caused to rotate in a known manner, there takes place at the push rod 56 a sine-shaped translation movement parallel to the rotor shaft 5. The lever 55y is periodically tilted upwardly and downwardly about its horizontal center position and this movement is transmitted through the knuckle joint to the lever 57 whereby, due to the obliquely extending axes II—II and I—I of the knuckle joints, the periodic tilting movement of the lever 55y is altered or changed in such a manner that upon small deviations from the center position the movement of the lever 57y is increased, while upon large deviations from the center position, in the vicinity of the dead center point, the movement of the lever 57y is decreased. Thus, in spite of the shortening of the axis length of the lever 11y which extends vertically to the rotor blade, there occurs upon larger deviations from its center position an almost sine-shaped advancing movement of the rotor blade 10y. The function and operation in this embodiment correspond to those of FIGS. 1, 3, 5 or 6.

It should be appreciated that the transmission mechanism is arranged so that the take-off rollers 13 and 14 achieve their slowest speed relative to the inclined swash plate when they are at their highest and lowest points of movement. When they have reached their center point of up and down movement at a location adjacent the bolt 2, the maximum velocity of this mechanism is reached. The differences in velocity during the passage of these rollers around on the swash plate are utilized in such a manner that in the vicinity of the center position of the blade or rotor 10 the radial push movement of the connecting rod 9 relative to the sine-shaped course is decreased. In FIGS. 8 and 9 there is indicated a graphic representation of the rotary angle and the rotary acceleration of the rotor blade in dependence on time. A curve indicated A corresponds to a turning angle for the turning acceleration respectively produced by a transmission means constructed in accordance with the invention. A typical path time representation of two types of transmissions are indicated in FIG. 8 while a typical acceleration time structure is indicated in FIG. 9. The most favorable conditions are obtained between the extreme types as indicated A in FIG. 8 and A' in FIG. 9.

A feature of the present transmission construction is that the last step of the movement is accomplished by a rocking member, such as a lever, which is connected to the rotor or blade 10 and the first step is achieved by a device for effecting periodic oscillation with stepless controllable amplitudes with a frequency of one oscillation per rotation. For this purpose, eccentrics with adjustable eccentricities, spiders and swash plates are employed.

For the spiders and swash plates two extreme types are in existence, one of which runs with constant rotary speed in the oblique plane, designated type I, while the second moves with a constant rotary speed in a vertical projection, designated type II (FIGS. 8 and 9).

Further, redirecting transmissions have been considered which convert a vertical movement into a horizontal movement and which make it possible to provide the first step of the transmission below the rotor head. Thereby, under certain circumstances, a decrease of the dimensions of the damaging resistance of rotor head and bearing arm can be obtained.

The intermediary transmissions may be constructed in such a manner that by these intermediary means the characteristics of the combination first step and last step is not changed, but is reproduced in the desired magnitude or reduction, as indicated in embodiment 3, for example. In such a case, the intermediary step does not significantly take part in the formation of the motion characteristics.

All possible transmissions of the first step supply either a harmonic course of a transmission, including an eccentric and a spider, as well as a swash plate of type I, or a torque-shaped course of transmission, including a spider and a swash plate of type II.

As mentioned previously, the typical path time representations of the two types of transmissions are indicated in FIG. 8, while the acceleration time indication is shown in FIG. 9.

Eccentric transmissions with adjustable eccentricity and swash plates are the simplest known transmissions which are suitable, for the purpose of the present invention, to move several parts at the same time and periodically. The movements produced exhibit a phase displacement and the amplitude of all the parts may, in some instances (FIG. 3), be simultaneously enlarged or diminished. Therefore, these transmissions are utilized as the first step of the rotary drive. The mentioned transmissions may produce, at various take-offs, periodic movements radially or axially relative to the rotational axis, with the harmonic course $X = A \sin \omega t$.

The movements are redirected into radial direction and are transferred via connecting rods onto the arms which are perpendicular relative to the blades and which are rigidly connected with the blades 10. The radial push movement of the connecting rods corresponds substantially to the law $X = A \sin \omega t$.

Due to the fact that arms with increasing rotary angle shorten their active radius, the acceleration of the free rotary motion is substantially smaller and corresponds only to the sine of the rotary movement angle.

The acceleration of the rotary movement may be decreased thereby that the swash plate, in its plane which is inclined relative to the increment angle 8 of movement, is caused to move slower than the rotor shaft in that part of its circumference which pertains to the larger rotary angle. This causes the take-off at the swash plate to be taken along with the constant rotary speed of the rotor shaft by means of a particular link and transferred into the inclined path of the swash plate.

Due to the decreased rotary speed of the swash plate, the enlargment of the rotary acceleration can be compensated for due to the shortening of the active lever arm. The best adaptation of the rotary acceleration of the transmission to the rotary acceleration of the free rotary movement of the centrifugal pendulum occurs when the sine of the inclination of the swash plate to the sine of the rotary amplitude has a ratio of about 1:0.65. This has been ascertained by mass experiments with electronic computers.

Thus, the invention provides means for controlling the acceleration of the rotor blades so that the movement of the blades approaches a free centrifugal pendulum.

While specific embodiments of the invention have been shown and described in detail to illustrate the application of the inventive principles, it will be understood that the invention may be embodied otherwise without departing from such principles.

What is claimed is:

1. A helicopter comprising a rotary central rotor head, a main rotor shaft mounted for rotation within said rotor head, a plurality of rotor blades mounted on said head for rotation therewith, means mounting said blades to said rotor head for pivotal lead and lag movement in addition to their rotation with said rotor head, a swash plate mounted concentrically around said rotor shaft for pivotal movement about an axis substantially perpendicular to said shaft for inclining said swash plate for controlling pivotal lead and lag movement of said blades, means rotatable around said swash plate, means for controlling the inclination of said swash plate, a plurality of pivotal crank arm lever members of a number corresponding to the number of said blades, means pivotally mounting said crank arm lever members on said shaft for rotation therewith and for pivotal rocking movement about an axis substantially perpendicular to the axis of said shaft, respective ones of said crank lever members having a first arm, means for connecting said first arm to an associated one of said blades for causing pivotal lead and lag movement of said blades, and a second arm, means for connecting said second arm to said means rotatable around said swash plate permitting movement of said crank lever members relative to each other, said crank lever members being rockable in accordance with the inclination of said swash plate upon rotation of said main rotor shaft.

2. A helicopter according to claim 1, wherein said means pivotally mounting said crank lever members on said shaft includes a pin extending radially outwardly from said shaft.

3. A helicopter according to claim 1, wherein said means rotatable around on said swash plate is an annular trackway which is mounted on said swash plate for rotation concentrically in respect thereto, said crank lever member's second arm having a roller at the end thereof engaged on said trackway.

4. A helicopter according to claim 1, wherein said means rotatable around on said swash plate includes a sliding block member.

5. A helicopter according to claim 4, wherein said means rotatable around on said swash plate further includes an annular member mounted on said swash plate for rotation concentrically therewith, said block member being slidable on said annular member.

6. A helicopter according to claim 1, wherein said means rotatable around on said swash plate includes a movable member including a guiding surface, said crank arm lever member's second arm having a roller at the end thereof in contact with the guiding surface of said movable member.

7. A helicopter according to claim 1, wherein said means for connecting said first arm to an associated one of said blades includes a connecting rod pivotally connected to said first arm.

8. A helicopter according to claim 1, wherein said means connecting said second arm to said means rotatable around on said swash plate includes a one-arm lever, means pivotally mounting said one-arm lever on said shaft for pivotal movement about an axis extending substantially radially in respect to said shaft, and a push rod pivotally connected between said second arm and the opposite end of said one-arm lever.

References Cited in the file of this patent

UNITED STATES PATENTS

| | | |
|---|---|---|
| 1,919,089 | Breguet et al. | July 18, 1933 |
| 2,511,687 | Andrews | June 13, 1950 |

FOREIGN PATENTS

| | | |
|---|---|---|
| 1,015,318 | Germany | Sept. 5, 1957 |
| 496,055 | Italy | June 20, 1954 |